April 30, 1940.    R. A. SYKES    2,198,684
WAVE FILTER
Filed Sept. 20, 1938    2 Sheets-Sheet 1

INVENTOR
R. A. SYKES
BY
Ralph P. Holcomb
ATTORNEY

April 30, 1940.  R. A. SYKES  2,198,684

WAVE FILTER

Filed Sept. 20, 1938   2 Sheets-Sheet 2

INVENTOR
R. A. SYKES
BY
Ralph P. Holcomb
ATTORNEY

Patented Apr. 30, 1940

2,198,684

UNITED STATES PATENT OFFICE 2,198,684

WAVE FILTER

Roger A. Sykes, Fanwood, N. J., assignor to Bell Telephone Laboratories, Incorporated, New York, N. Y., a corporation of New York Application September 20, 1938, Serial No. 230,775

25 Claims. (Cl. 178—44)

This invention relates to selective wave transmission networks which employ piezoelectric crystals as impedance elements and more particularly to wave filters of the unbalanced type.

An object of the invention is to increase the width of the transmission band in an unbalanced band-pass wave filter which uses piezoelectric crystals as impedance elements.

Another object is to provide a wave filter of this type in which the attenuation peaks may be located anywhere in the frequency spectrum, including regions far removed from the transmission band.

A further object is to increase the height of the peaks of attenuation.

Another object of the invention is to provide filter circuits of this type which have, respectively, inherently high and low image impedances.

The wave filter of the present invention is of the unbalanced, band-pass type and makes use of a single piezoelectric crystal having divided electrodes on both sides. Two of the electrodes are connected together and to the grounded side of the filter. The other two electrodes are connected, respectively, to an input terminal and the corresponding output terminal on the high side of the filter. Different types of attenuation characteristics may be obtained depending upon whether the two connected electrodes are on the same side of the crystal or on opposite sides. If the connected electrodes are on the same side they may be replaced by a single electrode. A bridging impedance branch including a capacitor is introduced between the two unconnected electrodes to change the location of the attenuation peaks. Equal capacitors may be connected in shunt at the end of the crystal to decrease the width of the transmission band.

In order to widen the transmission band two equal inductors are added to the filter circuit. For the higher frequency ranges these inductors may be sections of coaxial or shielded transmission line. If a filter having an inherently high image impedance is required the inductors are connected in shunt at the ends of the crystal, and if a low image impedance is desired they are connected in series with the crystal. In order to provide a greater variety of transmission characteristics the inductors may be inductively coupled, in either the series-aiding or the series-opposing relationship. By properly choosing the poling of the connections to the crystal electrodes, the location and the poling of the inductors and the coefficient of coupling any one of a great variety of attenuation characteristics may be provided.

These include a band-pass filter having two peaks of attenuation which may be placed both on the lower side of the band, both on the upper side, or one below and one above, and certain of the peaks may be made to occur at zero or infinite frequency.

In order to increase the height of the attenuation peaks a balancing resistance may be added to the filter. The resistance is connected either in parallel with the bridging branch or between a common terminal of the shunt inductors and the grounded side of the filter. The proper value of this resistance depends upon the effective resistance of the inductors and the coefficient of coupling, and its function is to maintain a resistive balance, at the peak frequencies, between the line and diagonal branches of the equivalent lattice network.

The nature of the invention will be more fully understood from the following detailed description and by reference to the accompanying drawings, of which:

Figure 1:
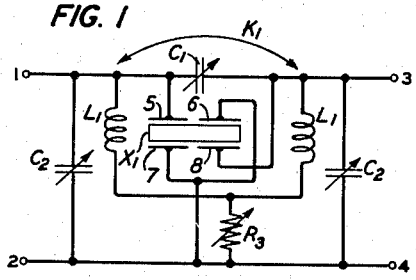
Fig. 1 is a schematic circuit of one form of the wave filter in accordance with the invention, in which the end inductors are connected in shunt and the cross-connection to the crystal electrodes is used.

Fig. 1 is a schematic circuit of one form of the wave filter in accordance with the invention employing shunt inductors and a cross-connected crystal. The filter is a symmetrical four-terminal network having a pair of input terminals 1, 2 and a pair of output terminals 3, 4 to which terminal loads of suitable impedance may be connected. The network is unbalanced in structure so that the path connecting terminals 2 and 4 may be grounded or otherwise fixed in potential. The path connecting terminals 1 and 3 may be termed the high side of the network. The filter comprises a piezoelectric crystal $X_1$ provided with two electrodes 5, 6 on one of the major faces and two oppositely disposed electrodes 7, 8 on the opposite face. The two diagonally opposite electrodes 6 and 7 are connected to the grounded side of the filter, and the remaining electrodes 5 and 8 are connected, respectively, to the input terminal 1 and the output terminal 3 on the high side of the network. The bridging branch comprising the capacitor $C_1$ is connected between the electrodes 5 and 8, and the two equal capacitors $C_2$, $C_2$ are connected in shunt at the ends of the crystal. The two equal shunt inductors $L_1$ and $L_1$ are connected at their upper ends to the respective ends of the bridging branch and their other ends are connected together and through the variable resistor $R_3$ to the grounded side of the filter. If the transmission band of the filter is centered in the higher frequency ranges, these inductors may advantageously be formed of sections of coaxial or shielded uniform transmission line. In other circumstances they may be ordinary coil windings with cores of either magnetic or non-magnetic material. The inductors are inductively coupled by a mutual inductance equal to $K_1L_1$ where $K_1$ represents the coefficient of coupling. Due to the presence of the shunt inductors this circuit has an inherently high image impedance. Fig. 1 shows the unbalanced form of the filter but it may, of course, be built as a balanced structure.

The crystal element $X_1$ is preferably of quartz in the form of a relatively narrow rectangular plate cut perpendicular to the electrical axis of the mother crystal and with its length either in the direction of the mechanical axis or making a selected acute angle therewith. Such a crystal will vibrate longitudinally when alternating potentials are applied to electrodes placed on the larger surfaces. Other well-known types of crystal cut may be used and, under certain conditions, they may be preferred. The crystal shown in Fig. 1 is of the rectangular type described above but for convenience is shown in end elevation.

Figure 2:
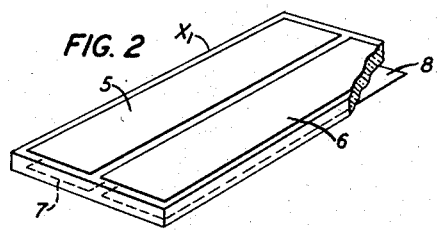
Fig. 2 is a perspective view partly broken away showing how the electrodes are placed upon the piezoelectric crystal element.

The placing of the electrodes on the crystal $X_1$ is shown more clearly in the perspective view of Fig. 2. A corner of the crystal has been broken away to expose a portion of one of the electrodes 8 on the under side of the crystal. The electrodes may be of silver, aluminum, or other suitable metal, plated directly onto the crystal, and may be applied by plating the two major surfaces all over and afterwards removing a narrow longitudinal strip of the plating along the center of each face. It is generally desirable also to remove narrow strips of plating around the edges of the crystal. When the crystal vibrates in the longitudinal mode it is preferably supported between one or more pairs of oppositely disposed points or knife-edge clamps which contact the crystal in the nodal region near the center and along the optical axis. Connections to the electrodes may be through these clamps or by attaching leads directly to the electrodes with soft solder.

Figure 3:
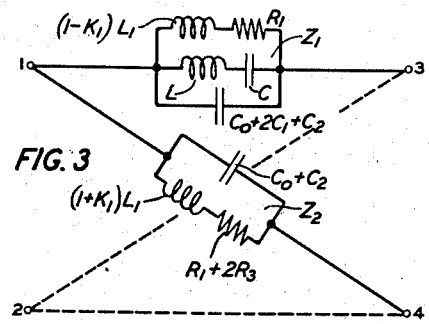
Fig. 3 shows the equivalent lattice network for the filter of Fig. 1.

Since the network of Fig. 1 is symmetrical with respect to its input terminals 1, 2 and its output terminals 3, 4 its properties may be investigated most conveniently from a consideration of the symmetrical lattice network to which it is equivalent. Each line branch of the equivalent lattice is equal to half of the impedance measured between the high side terminals 1 and 3 of Fig. 1, and each diagonal branch is equal to twice the impedance measured between terminals 1 and 3 strapped together and the grounded side, that is, terminal 2 or 4. It is apparent that the mechanical vibration of the crystal occurs for only one of these measurements, depending upon the poling of the connections to the crystal electrodes. Therefore, the impedance representing the piezoelectric properties of the crystal will appear in only one branch of the lattice. The electrode capacitance of the crystal, however, will appear in both branches. Fig. 3 shows the equivalent lattice for the poling of the electrodes shown in Fig. 1, where the interconnected electrodes are diagonally opposite to each other. For this case the crystal impedance appears in the line branch. It is assumed that the inductors $L_1$ and $L_1$ are connected in the series-opposing relationship.

In Fig. 3 the crystal impedance is represented by its equivalent electrical circuit comprising a capacitance $C_0$ shunted by a branch consisting of an inductance L in series with a second capacitance C. The capacitance $C_0$ represents the simple electrostatic capacitance between a pair of oppositely disposed electrodes, such as 5 and 7. The values of the capacitance C and the inductance L depend upon the dimensions of the crystal and upon its piezoelectric and elastic constants. These elements may be evaluated, in terms of the dimensions of the crystal $X_1$, from the following formulas, assuming that the crystal is of the X-cut variety described above and that the electrodes cover substantially the entire area of the two major faces:

$$L = \frac{212.2 lt}{w} \text{ henries} \qquad (1)$$

$$C = \frac{0.161 wl 10^{-14}}{t} \text{ farads} \qquad (2)$$

$$C_0 = \frac{20.1 wl 10^{-14}}{t} \text{ farads} \qquad (3)$$

in which $l$, $w$ and $t$ are, respectively, the length, width and thickness of the crystal measured in centimeters. It will be noted that these elements have twice the impedance of the corresponding elements in the equivalent circuit for a crystal of the same type having only a single electrode on each side.

As shown in Fig. 3 the equivalent lattice comprises two similar line impedance branches $Z_1$ and two similar diagonal impedance branches $Z_2$.

Figure 10:
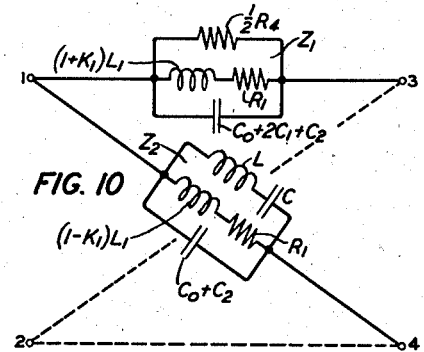
Fig. 10 is the equivalent lattice network for the filter of Fig. 9.

Each line branch is made up of three parallel arms, one consisting of an inductance equal to $(1-K_1)L_1$ in series with a resultance $R_1$ representing the effective resistance associated with the inductor $L_1$, the second consisting of the inductance $L$ in series with the capacitance $C$, and the third being a capacitance equal in magnitude to the sum of $C_0$, $2C_1$ and $C_2$. Each diagonal branch $Z_2$ is made up of a capacitance equal to the sum of $C_0$ and $C_2$ shunted by an arm consisting of an inductance equal to $(1+K_1)L_1$ in series with a resistance equal to the sum of $R_1$ and $2R_3$. For the sake of clarity, in this figure and also in Figs. 10 and 14 only one line branch and one diagonal branch are shown in detail, the other corresponding line and diagonal branches being indicated by dotted lines connecting the appropriate terminals.

The image impedance $Z_K$ of the lattice network of Fig. 3 is given in terms of the impedances of the line and diagonal branches by the expression $$Z_K = \sqrt{Z_1 Z_2} \quad (4)$$

and the propagation constant $P$ may be found from the expression $$\tanh \frac{P}{2} = \sqrt{\frac{Z_1}{Z_2}} \quad (5)$$

The filter will have a transmission band in the region where $Z_1$ and $Z_2$ are of opposite sign and will have attenuation bands where $Z_1$ and $Z_2$ are of the same sign, with peaks of attenuation occurring where these impedances are equal. By virtue of the equivalence of the two networks these expressions also give the impedance and propagation constant of the filter of Fig. 1.

Figure 4:
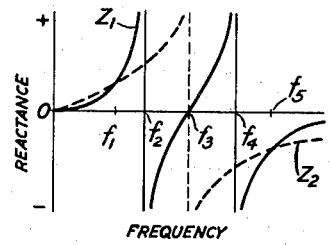
Fig. 4 represents the reactance-frequency characteristics of the impedance branches of the lattice network of Fig. 3.
Figure 5:
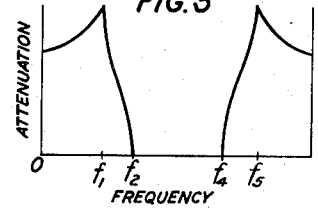
Figs. 5 and 6 represent typical attenuation characteristics for the filter of Figs. 1 and 3.

Fig. 4 gives the reactance-frequency characteristics of the line and diagonal branches of the lattice network of Fig. 3. As shown by the solid-line curve the line branch $Z_1$ has anti-resonances at the frequencies $f_2$ and $f_4$ with a resonance at the intermediate frequency $f_3$. The diagonal branch $Z_2$ has a single anti-resonance, as shown by the dotted-line curve, and if this is made to coincide with the resonance of the line branch at $f_3$ a band-pass filter will result. The transmission band will extend from $f_2$ to $f_4$ because in this region the reactances $Z_1$ and $Z_2$ are of opposite sign. Outside of this band the filter will attenuate since the reactances are of the same sign. If the inductors $L_1$ and $L_1$ are connected in the series-opposing relationship the reactance characteristics of $Z_1$ and $Z_2$ will cross at some frequency $f_1$ below the band and at another frequency $f_5$ above the band, as shown in Fig. 4. These crossing points will determine the location of the peaks of attenuation. A typical attenuation characteristic is shown in Fig. 5.

The coefficient of coupling $K_1$ is found from the formula:

$$K_1 = \frac{(A+B)^2 - (1+AB)^2}{(A+B)^2 + (1+B)^2} \quad (6)$$

in which $$A = \sqrt{\frac{1-\left(\frac{f_1}{f_2}\right)^2}{1-\left(\frac{f_1}{f_4}\right)^2}} \quad (7)$$

and $$B = \sqrt{\frac{1-\left(\frac{f_5}{f_2}\right)^2}{1-\left(\frac{f_5}{f_4}\right)^2}} \quad (8)$$

As mentioned above, the function of the added resistor $R_3$ in Fig. 1 is to provide a resistive balance at the peak frequencies for the line and diagonal branches of the equivalent lattice of Fig. 3 in order to increase the height of the attenuation peaks. The required value of $R_3$ may be found from the formula, $$R_3 = \frac{2K_1 R_1}{(1-K_1)^2} \quad (9)$$

where $R_1$ is the effective resistance of the inductor $L_1$ at some chosen frequency, say $f_3$. The resistor $R_3$ may be made variable, as indicated by the arrow, in order to facilitate its adjustment to the proper value. When $R_3$ is chosen in this way, the lattice of Fig. 3 will have the attenuation characteristic of a network made up of dissipationless elements with a resistance $R_0$ shunting the input terminals 1, 2 and a second resistance $R_0$ shunting the output terminals 3, 4. The value of this resistance is given by $$R_0 = \frac{(2\pi f L_1)^2 (1-K_1)^2}{R_1} \quad (10)$$

As the band width of the filter is increased the permissible ratio of the reactance of the inductor $L_1$ to its effective resistance $R_1$ is decreased. This means that for the wider bands a less efficient inductance coil may be used.

The values of the various reactance elements in the lattice of Fig. 3, including the electrical elements equivalent to the crystal, can be found from the resonant and anti-resonant frequencies of the $Z_1$ and $Z_2$ branches by a direct application of R. M. Foster's reactance theorem given in the Bell System Technical Journal, vol. III, No. 2, April 1928, pages 259 to 267. The values of the component elements in the network of Fig. 1 are found by applying the numerical factors indicated. For the filter shown in Fig. 1 and Fig. 3 the values of the elements are given by the following formulas:

$$L_1 = \frac{Z(f_4 - f_2)[(A+B)^2 + (1+AB)^2]}{4\pi f_2 f_4 (1+AB)(A+B)} \quad (11)$$

$$C = \frac{(f_4 - f_2)(A+B)}{2\pi Z f_2 f_4 (1+AB)} \quad (12)$$

$$C_0 + 2C_1 + C_2 = \frac{f_2 f_4 (A+B)}{2\pi Z (f_4 - f_2)(f_4^2 + f_2^2 AB)} \quad (13)$$

$$C_0 + C_2 = \frac{(f_4^2 + f_2^2 AB)}{2\pi Z f_2 f_4 (f_4 - f_2)(A+B)} \quad (14)$$

$$\frac{1}{2\pi \sqrt{LC}} = f_3 = f_4 \sqrt{\frac{1+AB}{\left(\frac{f_4}{f_2}\right)^2 + AB}} \quad (15)$$

in which $Z$ is the design impedance of the filter and is usually taken as the value of the image impedance at the mid-band frequency $f_3$.

Figure 6:
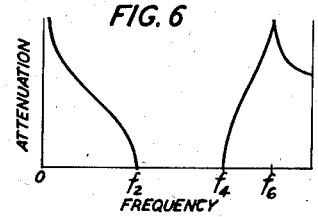

The chief purpose of the capacitor $C_1$ is to determine the location of the attenuation peaks and the capacitor may be made variable, as indicated, for small adjustments of these peaks. If this capacitor is omitted the upper peak will occur at infinite frequency. As the value of $C_1$ is increased the upper peak is moved to a lower frequency, and the peak at $f_1$ is also moved in the same direction. An adjustment of the coefficient of coupling $K_1$ moves the peaks in opposite directions. If $K_1$ is zero the lower peak will occur at zero frequency and the resulting attenuation characteristic will be as shown in Fig. 6. As the coefficient of coupling is increased the lower peak is moved to a higher frequency and the upper peak is moved to a lower frequency. There is thus provided an unbalanced filter using a piezoelectric crystal in which the lower peak may be located at any frequency between zero and the lower cut-off and the upper peak may be placed at any frequency between the upper cut-off and a high frequency which approaches infinity as the limit. The end capacitors $C_2$, $C_2$ have their chief effect upon the width of the transmission band and may be made variable, as shown, if desired. The widest band is obtained when these capacitors are omitted entirely.

Figure 7:
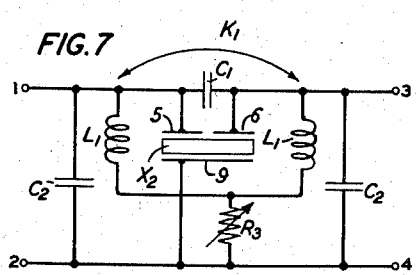
Fig. 7 shows the other poling for the connections to the electrodes of the crystal element in Fig. 1.
Figure 8:
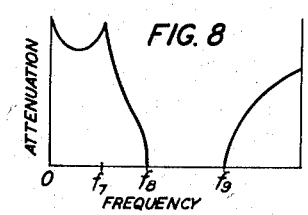
Fig. 8 represents a typical attenuation characteristic obtainable with the filter circuit of Fig. 7.

In Fig. 1 if the connections to the electrodes 6 and 8, for example, are interchanged, the circuit shown in Fig. 7 will result. Since the two electrodes 7 and 8 on the one side of the crystal $X_2$ are now connected together, they may be replaced by a single electrode 9 as shown. Changing the poling of the connections to the electrodes has the effect of removing the arm consisting of the inductance L and the capacitance C from the line branch $Z_1$ of the equivalent lattice shown in Fig. 3 and placing it in parallel with the other arms in the diagonal branch $Z_2$. The other component elements in the equivalent lattice will be the same as shown in Fig. 3. If the inductors $L_1$ and $L_1$ are uncoupled, the high-frequency peak will be transferred to the lower side of the band while the peak at zero remains. Fig. 8 shows a typical attenuation characteristic, with peaks at zero and $f_7$ and a transmission band from $f_8$ to $f_9$.

Figure 9:
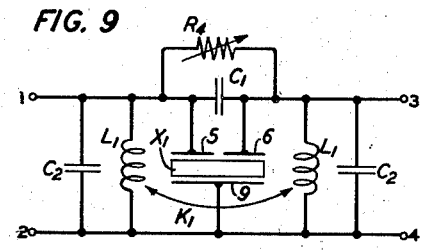
Fig. 9 shows a modification of the filter circuit of Fig. 7 in which the inductors are connected series aiding.
Figure 11:
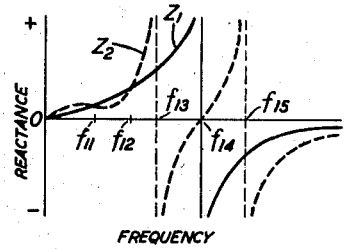
Fig. 11 shows the reactance-frequency characteristics of the impedance branches of the lattice network of Fig. 10.
Figure 12:
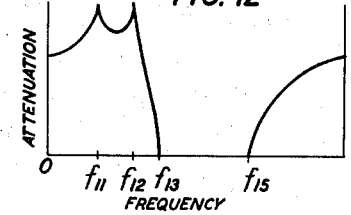
Fig. 12 represents a typical attenuation characteristic for the filter of Figs. 9 and 10.

In the circuit of Fig. 7 if the connection of the inductors is changed to the series-aiding relationship the shunt balancing resistor $R_3$ may be omitted, but a resistor $R_4$ connected in parallel with the bridging capacitor $C_1$ will, in general, be required. The circuit is shown in Fig. 9. The value of $R_4$ may be found from the formula, $$R_4 = \frac{\omega^2 L_1^2 (1+K_1)^2 (1-K_1)^2}{4 K_1 R_1} \tag{16}$$

in which $\omega$ is $2\pi$ times the frequency at which a resistive balance is desired. The equivalent lattice network is given in Fig. 10 and the reactance characteristics of the line and diagonal impedance branches in Fig. 11. As shown by the typical attenuation characteristic in Fig. 12 there will be two attenuation peaks at $f_{11}$ and $f_{12}$ on the lower side of the transmission band, which extends from $f_{13}$ to $f_{15}$.

In placing the balancing resistor $R_3$ in the path connecting the common terminal of the shunt inductors $L_1$, $L_1$ and the grounded side of the filter as shown in Figs. 1 and 7, it is assumed that the core losses in the coils are low, such as are found in air-core coils. If inductors having magnetic cores, such as iron, are used it may be that the core losses are more than sufficient to supply, in effect, the resistance $R_3$. In this case the resistive balance at the peak frequencies may be restored by the addition of a balancing resistor in parallel with the bridging branch, connected as is $R_4$ in Fig. 9.

Figure 13:
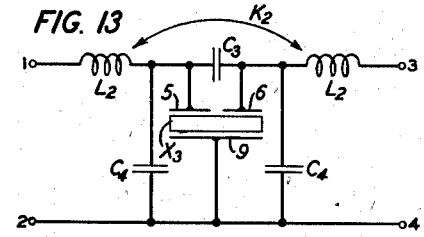
Fig. 13 shows another embodiment of the invention in which the inductors are connected in series at the ends of the filter.

In order to provide a filter having an inherently low image impedance the inductors are connected in series on the high side at the ends of the network, as shown in Fig. 13. In this figure also the interconnected electrodes are on the same side of the crystal $X_3$ and are replaced by a single electrode 9. The bridging capacitor $C_3$ is connected between the two electrodes 5 and 6, and the equal capacitors $C_4$, $C_4$ are connected in shunt at the ends of the crystal. In this case no balancing resistor will ordinarily be required.

Figure 14:
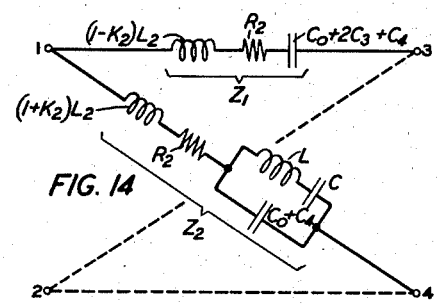
Fig. 14 shows the equivalent lattice network for the filter of Fig. 13.
Figure 15:
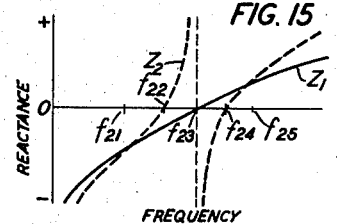
Fig. 15 shows the reactance-frequency characteristics of the impedance branches of the lattice network of Fig. 14.
Figure 16:
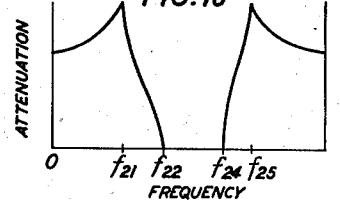
Figs. 16 and 17 represent typical attenuation characteristics for the filter of Figs. 13 and 14.

In Fig. 13 if the inductors $L_2$ and $L_2$ are inductively coupled series opposing with a coefficient of coupling $K_2$ the equivalent lattice will be as shown in Fig. 14 and the reactance-frequency characteristics of the impedance branches will be of the type shown in Fig. 15. The diagonal branch $Z_2$ has a resonance at the frequency $f_{22}$, a second resonance at $f_{24}$ and an intermediate anti-resonance at $f_{23}$, as shown by the dotted line curve. The line branch $Z_1$ has a single resonance, as shown by the solid line curve, and if this is made to coincide with the anti-resonance of the diagonal branch at $f_{23}$ a band-pass filter will result. As shown by the attenuation characteristic of Fig. 16 the transmission band will extend from $f_{22}$ to $f_{24}$ and peaks of attenuation will occur at $f_{21}$ on the lower side of the band and at $f_{25}$ on the upper side, where the two reactance curves cross.

In Fig. 13 the coefficient of coupling $K_2$ may be found from the formula, $$K_2 = 1 - \frac{2}{1 + \left(\frac{f_{22} f_{24} F}{f_{24}^2 + f_{22}^2 G}\right)^2} \tag{17}$$

in which $$F = D + E \tag{18}$$

$$G = DE \tag{19}$$

$$D = \sqrt{\frac{1-\left(\frac{f_{21}}{f_{22}}\right)^2}{1-\left(\frac{f_{21}}{f_{24}}\right)^2}} \tag{20}$$

and $$E = \sqrt{\frac{1-\left(\frac{f_{25}}{f_{22}}\right)^2}{1-\left(\frac{f_{25}}{f_{24}}\right)^2}} \tag{21}$$

The values of the component elements may be found from the following formulas:

$$L_2 = \frac{Z[f_{22}^2 f_{24}^2 F + (f_{24}^2 + f^2 G)^2]}{4\pi f_{22} f_{24} F (f_{24} - f_{22})(f_{24}^2 + f_{22}^2 G)} \tag{22}$$

$$C = \frac{(f_{24} - f_{22})^3 (f_{24}^2 + f_{22}^2)^2 G}{2\pi Z f_{22}^2 f_{24} (f_{24}^4 + f_{22}^4 G) F} \tag{23}$$

$$\frac{C_0 + C_4}{C} = \frac{(f_{24}^2 + f_{22}^2 G)^2}{(f_{24} - f_{22})^2 (f_{24}^2 + f_{22}^2)^2 G} \tag{24}$$

$$\frac{1}{2\pi\sqrt{LC}} = f_{22} f_{24} \sqrt{\frac{f_{24}^2 + f_{22}^2 G}{f_{24}^4 + f_{22}^4 G}} \tag{25}$$

$$C_0 + 2C_3 + C_4 = \frac{(f_{24} - f_{22}) F}{2\pi Z f_{22} f_{24} (1+G)} \tag{26}$$

$$C_0 + C_4 = \frac{(f_{24} - f_{22})(f_{24}^2 + f_{22}^2 G)^2}{2\pi Z f_{22}^2 f_{24} (f_{24}^4 + f_{22}^4 G) F} \tag{27}$$

Figure 18:
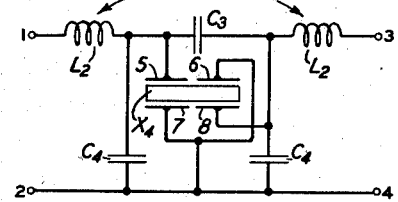
Fig. 18 shows a modification of the filter of Fig. 13 in which the cross-connection to the crystal electrodes is used.
Figure 19:
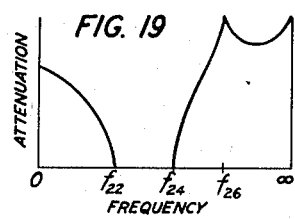
Fig. 19 represents a typical attenuation characteristic obtainable with the filter of Fig. 18.
Figure 17:
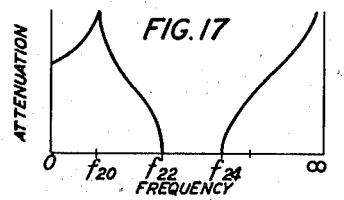

As the coupling between the inductors $L_2$, $L_2$ in Fig. 13 is progressively decreased the upper attenuation peak occurring at $f_{25}$ is moved to a higher and higher frequency until, when $K_2$ is equal to zero, the peak is relegated to infinite frequency, as shown in Fig. 17. At the same time the peak on the lower side of the band is moved down to some lower frequency $f_{20}$. If $K_2$ is kept zero and a cross-connected crystal $X_4$ is used, as shown in Fig. 18, the peak below the band will be transferred to some frequency $f_{26}$ on the upper side of the band, as shown in Fig. 19. The peak at infinity will remain as before.

What is claimed is:

1. A wave filter comprising a pair of input terminals, a pair of output terminals, a bridging impedance branch including a capacitor connected between an input terminal and a corresponding output terminal, a piezoelectric crystal and two inductors, said crystal having two electrodes associated with one face and two other oppositely disposed electrodes associated with the opposite face, two of said electrodes being connected respectively to the terminals of said bridging branch, the remaining electrodes being connected to the remaining filter terminals, said inductors being connected at the respective ends of said crystal, the impedance measured between said first-mentioned input and output terminals having a different reactance-frequency characteristic from that of the impedance measured between said first-mentioned input and output terminals strapped together and the remaining terminals strapped together, and said two measured impedances being proportioned with respect to each other and with respect to two preassigned frequencies so that said filter will freely transmit a band lying between said frequencies while attenuating other frequencies.

2. A wave filter in accordance with claim 1 in which said inductors are connected in series with said crystal.

3. A wave filter in accordance with claim 1 in which said inductors are connected respectively between the terminals of said bridging branch and said remaining filter terminals.

4. A wave filter in accordance with claim 1 in which said inductors are inductively coupled.

5. A wave filter in accordance with claim 1 in which said inductors are inductively coupled in the series-aiding relationship.

6. A wave filter in accordance with claim 1 in which said inductors are inductively coupled in the series-opposing relationship.

7. A wave filter in accordance with claim 1 which includes a resistor to increase the height of an attenuation peak, said inductors being connected respectively between the terminals of said bridging branch and one end of said resistor, and the other end of said resistor being connected to said remaining filter terminals.

8. A wave filter in accordance with claim 1 which includes a resistor connected in parallel with said bridging branch to increase the height of an attenuation peak.

9. A wave filter in accordance with claim 1 in which said two interconnected electrodes are associated with the same face of said crystal.

10. A wave filter in accordance with claim 1 in which said two interconnected electrodes are associated with opposite faces of said crystal and are diagonally opposite to each other.

11. A wave filter in accordance with claim 1 which includes two capacitors connected in shunt at the respective ends of said crystal.

12. A wave filter comprising a pair of input terminals, a pair of output terminals, a bridging impedance branch including a capacitor connected between an input terminal and a corresponding output terminal, a piezoelectric crystal and two inductors, said crystal having two electrodes associated with one face and two other oppositely disposed electrodes associated with the opposite face, an electrode on one face and a diagonally opposite electrode on the opposite face being connected respectively to the terminals of said bridging branch, the remaining electrodes being connected to the remaining filter terminals, said inductors having a common terminal connected to said remaining filter terminals, the other ends of said inductors being connected respectively to the terminals of said bridging branch, and the dimensions of said crystal and the values of said capacitor and said inductors being proportioned with respect to each other and with respect to a pair of preassigned frequencies to provide a transmission band between said frequencies.

13. A wave filter in accordance with claim 12 in which said inductors are inductively coupled in the series-opposing relationship.

14. A wave filter in accordance with claim 12 which includes two capacitors connected in shunt at the respective ends of said crystal.

15. A wave filter in accordance with claim 12 which includes a resistor in the path connecting the common terminal of said inductors to said remaining filter terminals to increase the height of an attenuation peak.

16. A wave filter comprising a pair of input terminals, a pair of output terminals, a bridging impedance branch including a capacitor connected between an input terminal and a corresponding output terminal, a piezoelectric crystal and two inductors, said crystal having a pair of electrodes associated with one face and a single electrode associated with the opposite face, said pair of electrodes being connected respectively to the terminals of said bridging branch, said single electrode being connected to the remaining filter terminals, said inductors having a common terminal connected to said remaining filter terminals, the other ends of said inductors being connected respectively to the terminals of said bridging branch, and the dimensions of said crystal and the values of said capacitor and said inductors being proportioned with respect to each other and with respect to a pair of preassigned frequencies to provide a transmission band between said frequencies.

17. A wave filter in accordance with claim 16 in which said inductors are inductively coupled in the series-aiding relationship.

18. A wave filter in accordance with claim 16 which includes two capacitors connected in shunt at the respective ends of said crystal.

19. A wave filter in accordance with claim 16 which includes a resistor connected in parallel with said bridging branch to increase the height of an attenuation peak.

20. A wave filter comprising a pair of input terminals, a pair of output terminals, a piezoelectric crystal, two inductors and a bridging impedance branch including a capacitor, said crystal having a single electrode associated with one face and a pair of electrodes associated with the opposite face, said single electrode being connected to an input terminal and a corresponding output terminal, one of said inductors being connected between the remaining input terminal and one of said pair of electrodes, the other of said inductors being connected between the remaining output terminal and the other of said pair of electrodes, said bridging branch being connected between said pair of electrodes, and the dimensions of said crystal and the values of said inductors and said capacitor being proportioned with respect to each other and with respect to two preassigned frequencies to provide a transmission band between said frequencies.

21. A wave filter in accordance with claim 20 in which said inductors are inductively coupled in the series-opposing relationship.

22. A wave filter in accordance with claim 20 which includes two capacitors connected in shunt at the respective ends of said crystal.

23. A wave filter comprising a pair of input terminals, a pair of output terminals, a piezoelectric crystal, two inductors, a pair of capacitors and a third capacitor, said crystal having two electrodes associated with one face and two other oppositely disposed electrodes associated with the opposite face, an electrode on one face and a diagonally opposite electrode on the opposite face being connected together and to an input terminal and a corresponding output terminal, the remaining electrodes being connected respectively to the remaining terminals, said pair of capacitors being connected in shunt at the respective ends of said crystal, said third capacitor being connected between said remaining electrodes, said inductors being inductively coupled in the series-opposing relationship and connected respectively between one of said remaining electrodes and said first-mentioned input and output terminals, and the dimensions of said crystal and the values of said inductors and said capacitors being proportioned with respect to one another and with respect to two preassigned frequencies to provide a transmission band between said frequencies.

24. A wave filter comprising a pair of input terminals, a pair of output terminals, a piezoelectric crystal, two inductors, a pair of capacitors and a third capacitor, said crystal having a single electrode associated with one face and a pair of electrodes associated with the opposite face, said single electrode being connected to an input terminal and a corresponding output terminal, said pair of electrodes being connected respectively to the remaining terminals, said inductors being connected respectively between one of said pair of electrodes and said first-mentioned input and output terminals, said pair of capacitors being connected in shunt at the respective ends of said crystal, said third capacitor being connected between said pair of electrodes, and the dimensions of said crystal and the values of said inductors and said capacitors being proportioned with respect to one another and with respect to two preassigned frequencies to provide a transmission band between said frequencies.

25. A wave filter comprising a pair of input terminals, a pair of output terminals, a piezoelectric crystal, two inductors, a pair of capacitors and a third capacitor, said crystal having a single electrode associated with one face and a pair of electrodes associated with the opposite face, said single electrode being connected to an input terminal and a corresponding output terminal, one of said inductors being connected between the remaining input terminal and one of said pair of electrodes, the other of said inductors being connected between the remaining output terminal and the other of said pair of electrodes, said pair of capacitors being connected in shunt at the respective ends of said crystal, said third capacitor being connected between said pair of electrodes, and the dimensions of said crystal and the values of said inductors and said capacitors being proportioned with respect to one another and with respect to two preassigned frequencies to provide a transmission band between said frequencies.

ROGER A. SYKES.